S. E. FEIST.
APPARATUS FOR TEACHING DANCING.
APPLICATION FILED JULY 22, 1920.
1,374,840.
Patented Apr. 12, 1921.
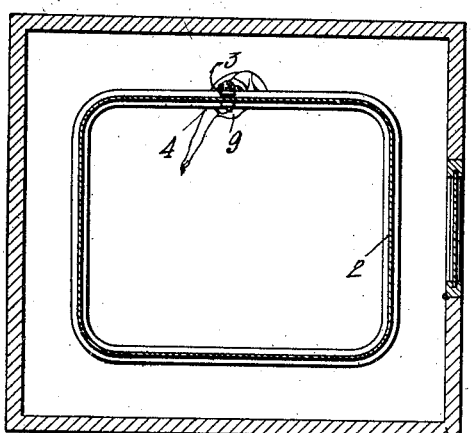
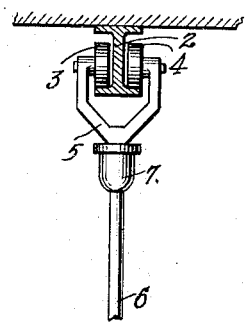
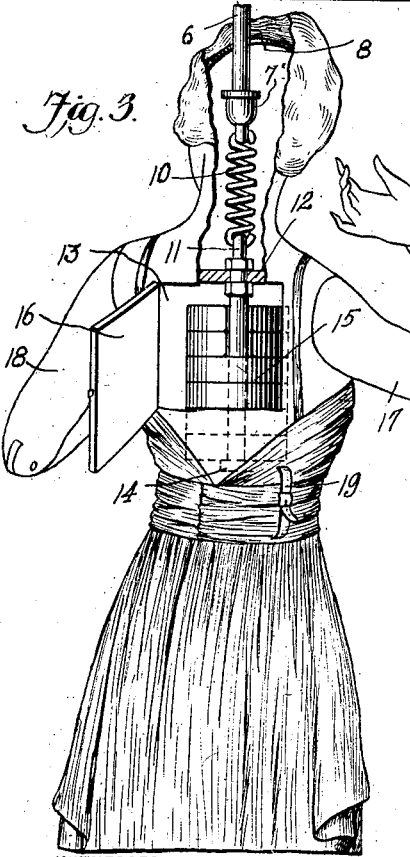
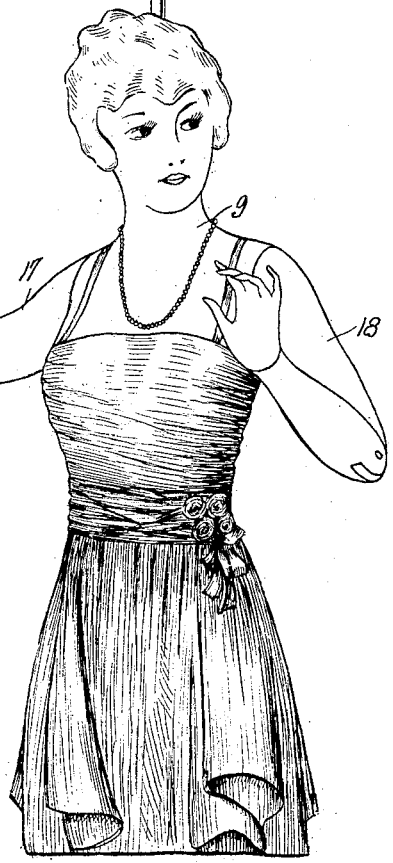
WITNESSES
INVENTOR
SIDNEY E. FEIST
BY
ATTORNEYS

UNITED STATES PATENT OFFICE.

SIDNEY E. FEIST, OF BROOKLYN, NEW YORK.

APPARATUS FOR TEACHING DANCING.

1,374,840. Specification of Letters Patent. Patented Apr. 12, 1921.

Application filed July 22, 1920. Serial No. 398,277.

*To all whom it may concern:*

Be it known that I, SIDNEY E. FEIST, a citizen of the United States, and a resident of the city of New York, borough of Brooklyn, in the county of Kings and State of New York, have invented a new and useful Apparatus for Teaching Dancing, of which the following is a full, clear, and exact description.

This invention relates to an apparatus for teaching dancing, and has for an object to provide an improved construction which will automatically cause a person to assume a proper position when dancing.

Another object of the invention is to provide an apparatus for causing a male student to lead in a proper manner.

A further object, more specifically, is the provision of a form or dummy and supporting means therefor which will cause a student to go through the proper movements in dancing when using the form as a partner, the form causing the student to initiate all the moves and thereby experience the necessity of acting on his own initiative.

In the accompanying drawing:

Figure 1 is a sectional view through the upper part of a room with an apparatus embodying the invention shown applied thereto.

Fig. 2 is a front view of a figure and a support therefor embodying certain features of the invention.

Fig. 3 is a rear view of the figure shown in Fig. 2, the same having certain parts broken away for illustrating the construction thereof.

Referring to the accompanying drawing by numerals, 1 indicates a room of any kind which is provided with a track 2 connected with the ceiling or supported an appreciable distance from the floor in any desired manner. Track 2 is preferably an I-beam structure, as shown in Fig. 2, so as to accommodate the rollers or wheels 3 and 4 carried by the bracket 5. This bracket is connected to a supporting rod 6 by a universal joint or connection 7 whereby the rod 6 may swing in substantially any direction. The rod 6 extends downwardly and through an opening 8 in the head of the figure 9. The lower end of the rod 6 is connected with a spring 10 which in turn is connected with a rod 11, said rod being clamped rigidly to a partition member 12 forming part of the figure 9 whereby said figure is supported and is resiliently held in substantially the position shown in Fig. 2 by reason of the spring 10. Below the partition 12 there is provided a chamber 13 into which the rod 11 extends, said rod having a stop enlargement 14 at the lower end. On the rod 11 in chamber 13 are arranged a number of weights 15 which are preferably removable. Preferably these weights are formed with a slot extending from the periphery to slightly past the center so that they may be slidingly fitted in position over rod 11 and thereby add to the weight of figure 9. A suitable door 16 is arranged at the back of the figure 9, which is preferably supported by suitable hinges and normally held closed by a suitable catch.

The figure 9 conforms to the usual shape of the upper part of a natural body and is shown as representing a woman. The arms 17 and 18 of the figure are preferably articulated at the shoulders and elbows in any desired manner so that they will remain in any position in which they are placed, though easily movable therefrom. At a suitable point on the back of the figure 9 is arranged a hand retaining member 19 which is preferably a strap and buckle structure whereby the hand of the pupil may be strapped to the figure in substantially the correct position.

In operation, in teaching a male pupil to dance the right hand of the pupil is passed partially around the figure and is clamped in place by the clamping member 19. The instructor then positions the arms 17 and 18 correctly in respect to the pupil and requires the pupil to place his left hand in correct position on the end of the arm 17. After having been correctly positioned by the instructor the pupil then takes the proper steps and pulls the figure 9 with him which naturally causes him to learn to lead when dancing with a natural person. As the figure 9 is nothing but a dummy the pupil must lead and move the figure, which figure may freely rotate by reason of the universal connection 7 and may move around the room by reason of the track 2 and the connection of the rod 6 therewith. It will be of course understood that the pupil must have been previously taught the proper steps before he is permitted to dance with the figure. After the pupil has learned somewhat the correct procedure he is required to dance with the figure without prompting from the instructor except occasionally, and this exercise is continued until the pupil has not only learned to lead properly, but to place his hand properly and to take the proper steps all simultaneously. In the act of dancing the rod or bar 6 is swung to one side whenever desired, but usually the dummy or figure 9 remains in a vertical position as it pivots or turns on the universal pivot or connection 7'. The opening 8 in the head of the figure is sufficient to allow this movement to a large extent in order not to in any way interfere with the free action of the pupil in dancing with the figure.

What I claim is:

1. An apparatus for teaching dancing comprising a figure, a track and means suspended from said track for supporting the figure so that the figure may swing, rotate and at the same time move in a substantially circular path in a general horizontal direction.

2. An apparatus for teaching dancing comprising a swinging dummy provided with adjustable arms, and a movable support arranged above the dummy on which said dummy is swung whereby a pupil may move the dummy in a substantially horizontal direction in a circular path.

3. An apparatus for teaching dancing comprising a dummy provided with arms articulated at the joints whereby they may be positioned as desired during a lesson, means for securing one hand of a pupil to the dummy, and means for supporting the dummy so that the pupil may rotate the same and move the same in a substantially horizontal direction.

4. An apparatus for teaching dancing comprising a dummy provided with arms, a supporting rod connected with the dummy, a supporting track, means for connecting the supporting rod with the supporting track, said means including anti-friction members adapted to roll along said track, and a universal joint whereby the rod may swing in any direction desired as it moves along said track.

5. An apparatus for teaching dancing comprising a dummy formed with a chamber, a swinging supporting rod for said dummy, a track for supporting the supporting rod so that it may be moved horizontally, and a plurality of removable weights arranged in said chamber whereby the weight of the dummy may be varied to suit the pupil.

6. An apparatus for teaching dancing comprising a dummy formed with a pair of chambers, a supporting rod extending into one of said chambers, a spring connected with the end of said supporting rod, means for connecting the opposite end of said spring to the dummy whereby the dummy is resiliently supported, a plurality of removable weights arranged in one of said chambers, and means for supporting said supporting rod so that the rod and dummy may swing and at the same time move in a horizontal direction.

7. An apparatus for teaching dancing comprising an endless elevated track, anti-friction members engaging said track, a suspension member engaging said anti-friction member, a universal joint connected with said suspension member, a rod connected with said universal joint, a dummy connected with said rod and supported thereby, and means for securing one hand of a pupil to the dummy whereby the pupil may swing, turn and move the dummy in substantially any direction while following said track.

SIDNEY E. FEIST.